(12) United States Patent
Nelson et al.

(10) Patent No.: US 11,845,248 B2
(45) Date of Patent: Dec. 19, 2023

(54) EXPANDED POLYTETRAFLUOROETHYLENE COMPOSITE

(71) Applicant: Donaldson Company, Inc., Minneapolis, MN (US)

(72) Inventors: Robert O. Nelson, Eagan, MN (US); Suresh B. Bommineni, Shakopee, MN (US); Neil L. Taurinskas, Chisago City, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 71 days.

(21) Appl. No.: 17/174,661

(22) Filed: Feb. 12, 2021

(65) Prior Publication Data
US 2021/0252843 A1    Aug. 19, 2021

Related U.S. Application Data

(60) Provisional application No. 62/976,933, filed on Feb. 14, 2020.

(51) Int. Cl.
*B32B 27/32* (2006.01)
*B32B 27/08* (2006.01)
(Continued)

(52) U.S. Cl.
CPC ............ *B32B 27/322* (2013.01); *B32B 5/022* (2013.01); *B32B 27/08* (2013.01); *B32B 27/365* (2013.01);
(Continued)

(58) Field of Classification Search
CPC ............ B32B 2250/03; B32B 2250/04; B32B 2250/24; B32B 2250/40;
(Continued)

(56) References Cited

U.S. PATENT DOCUMENTS

| | | |
|---|---|---|
| 4,963,416 A | 10/1990 | Thompson |
| 5,019,140 A | 5/1991 | Bowser et al. |

(Continued)

FOREIGN PATENT DOCUMENTS

| | | |
|---|---|---|
| EP | 0374605 | 1/1994 |
| EP | 1207917 | 5/2003 |
| WO | 2015/157681 | 10/2015 |

OTHER PUBLICATIONS

ASTM D3330/D3330M-04, "Standard Test Method for Peel Adhesion of Pressure-Sensitive Tape", Nov. 2018, ASTM International, West Conshohocken, Pennsylvania, 6 pages.
(Continued)

*Primary Examiner* — Hai Vo
(74) *Attorney, Agent, or Firm* — Mueting Raasch Group (57) ABSTRACT

This disclosure describes an expanded polytetrafluoroethylene (ePTFE) composite, methods of making the composite, and methods of using the composite. In some aspects, the ePTFE composite includes a first layer of ePTFE, a nonwoven layer, and a second layer of ePTFE, wherein a major surface of the first layer of ePTFE is in contact with a first major surface of the nonwoven layer, and wherein a first major surface of the second layer of ePTFE is in contact with a second major surface of the nonwoven layer.

12 Claims, 5 Drawing Sheets

(51) Int. Cl.
*B32B 5/02* (2006.01)
*B32B 27/36* (2006.01)
*B32B 37/06* (2006.01)
*B32B 37/18* (2006.01)

(52) U.S. Cl.
CPC .............. *B32B 37/06* (2013.01); *B32B 37/18* (2013.01); *B32B 2250/03* (2013.01); *B32B 2250/04* (2013.01); *B32B 2250/24* (2013.01); *B32B 2305/026* (2013.01); *B32B 2307/724* (2013.01); *B32B 2307/732* (2013.01)

(58) Field of Classification Search
CPC ...... B32B 2262/0276; B32B 2266/025; B32B 2305/026; B32B 2307/54; B32B 2307/558; B32B 2307/718; B32B 2307/724; B32B 2307/726; B32B 2307/732; B32B 27/065; B32B 27/08; B32B 27/32; B32B 27/322; B32B 27/34; B32B 27/36; B32B 27/365; B32B 37/06; B32B 37/18; B32B 5/022; B32B 5/18; B32B 5/245
See application file for complete search history.

(56) References Cited

U.S. PATENT DOCUMENTS

| | | | |
|---|---|---|---|
| 5,037,457 | A | 8/1991 | Goldsmith et al. |
| 6,454,744 | B1 | 9/2002 | Spohn et al. |
| 7,541,187 | B2 | 6/2009 | Myles et al. |
| 9,132,616 | B2 | 9/2015 | Farzana et al. |
| 9,364,653 | B2 | 6/2016 | Williams et al. |
| 2008/0081763 | A1 | 4/2008 | Swetlin et al. |
| 2009/0188575 | A1 | 7/2009 | Williams et al. |
| 2012/0017763 | A1* | 1/2012 | Velpari ................ B01D 39/163 28/107 |
| 2012/0048800 | A1* | 3/2012 | Farzana .................. B32B 37/02 156/308.2 |
| 2013/0289517 | A1* | 10/2013 | Williams .............. A61M 39/18 604/500 |
| 2016/0016126 | A1* | 1/2016 | Zhang ................ B01D 39/1692 210/489 |
| 2016/0101219 | A1 | 4/2016 | Jennings et al. |
| 2017/0014549 | A1 | 1/2017 | Nikolis et al. |

OTHER PUBLICATIONS

ASTM D737-18, "Standard Test Method for Air Permeability of Textile Fabrics", Jan. 2018, ASTM International, West Conshohocken, Pennsylvania, 5 pages.

ASTM D903-98, "Standard Test Method for Peel or Stripping Strength of Adhesive Bonds", Nov. 2017, ASTM International, West Conshohocken, Pennsylvania, 3 pages.

ASTM F316-03, "Standard Test Methods for Pore Size Characteristics of Membrane Filters by Bubble Point and Mean Flow Pore Test", Dec. 2019, ASTM International, West Conshohocken, Pennsylvania, 7 pages.

Hutten, Handbook of Nonwoven Filter Media, 2007, Butterworth-Heinemann, Oxford, United Kingdom and Burlington, Massachusetts, Title page, publication page and pp. 250-255.

Pendelbury, "Cell & Gene Therapies: A Guide to Single-Use Connections: 10 Transferable Lessons From The Bioprocessing Industry", White Paper 6006, Feb. 2018, Bioprocess Online, 13 pages. Available online at https://content.cpcworldwide.com/Portals/0/Library/Resources/Literature/WhitePapers/Documents/CPC-cell-gene-therapies_white-paper.pdf.

TAPPI T 403 om-02, "Bursting strength of paper", 2002 TAPPI, 6 pages.

TAPPI T 494 om-06, "Tensile properties of paper and paperboard (using constant rate of elongation apparatus)", 2006 TAPPI, 9 pages.

TAPPI/ANSI T 411 om-15, "Thickness (caliper) of paper, paperboard, and combined board", 2015 TAPPI, 4 pages.

Ebnesajjad, et al., "Peel Test—an overview", ScienceDirect Topics, 2021 Science Direct, Elsevier B.V., 12 pages. Obtained from the internet on Feb. 9, 2021. Available online at https://www.sciencedirect.com/topics/engineering/peel-test.

Makinson, et al., "The Friction and Transfer of Polytetrafluoroethylene", Aug. 25, 1964, Proceedings of the Royal Society of London Series A, Mathematical and Physical Sciences, Royal Society, London, United Kingdom, 281 (1384):49-61. Retrieved from the internet on Feb. 11, 2021. Available online at https://royalsocietypublishing.org/doi/pdf/10.1098/rspa.1964.0168.

Material Data Sheet, "Integrated Venting Solutions-EN.07.01.957", Donaldson Filtration Solutions, Aug. 19, 2019, Donaldson Company, Inc. Minneapolis, Minnesota, USA, 1 page.

* cited by examiner

EXPANDED POLYTETRAFLUOROETHYLENE COMPOSITE

CROSS-REFERENCE TO RELATED APPLICATIONS

This application claims the benefit of U.S. Provisional Application Ser. No. 62/976,933, filed Feb. 14, 2020, which is incorporated by reference herein in its entirety.

SUMMARY OF THE INVENTION

This disclosure describes an expanded polytetrafluoroethylene (ePTFE) composite, methods of making the composite, and methods of using the composite.

In one aspect, this disclosure describes an ePTFE composite that includes a first layer of ePTFE, a nonwoven layer, and a second layer of ePTFE, wherein a major surface of the first layer of ePTFE is in contact with a first major surface of the nonwoven layer, and wherein a first major surface of the second layer of ePTFE is in contact with a second major surface of the nonwoven layer.

In an exemplary embodiment, the ePTFE composite includes a first layer of ePTFE, wherein the first layer of ePTFE has a 0.07 micron pore size, a thickness of up to 0.06096 mm (0.0024 inches), and an average airflow of 0.3 cubic feet per minute per square foot (cfm/min/sq ft) at 0.5 inches of water (31 Liters per hour per square centimeter (L/hour/cm$^2$) at 70 millibar (mbar)); a nonwoven layer, the nonwoven layer comprises a nonwoven spunbonded polyester having a basis weight of 60 grams per square meter (gsm), and a thickness of up to 0.254 mm (0.010 inches); and a second layer of ePTFE, wherein the second layer of ePTFE has a 1.5 micron pore size, a thickness of up to 0.03 mm (0.0015 inches), and an average airflow of 7 cfm/min/sq ft at 0.5 inches of water (720 L/hour/cm$^2$ at 70 mbar). A major surface of the first layer of ePTFE is heat laminated to a first major surface of the nonwoven layer, and wherein a first major surface of the second layer of ePTFE is heat laminated to a second major surface of the nonwoven layer.

This disclosure further describes methods of making the composites and methods of using the composites.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements.

Any reference to standard methods (e.g., ASTM, TAPPI, AATCC, etc.) refer to the most recent available version of the method at the time of filing of this disclosure unless otherwise indicated.

Also herein, the recitations of numerical ranges by endpoints include all numbers subsumed within that range (e.g., 1 to 5 includes 1, 1.5, 2, 2.75, 3, 3.80, 4, 5, etc.).

Herein, "up to" a number (for example, up to 50) includes the number (for example, 50).

The terms "in a range" or "within a range" (and similar statements) include the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

AIRFLOW/PERMEABILITY TESTING

Air permeability (also referred to as Frazier air permeability or airflow) was measured according to ASTM D737-18, entitled "Test Method for Air Permeability of Textile Fabrics."

DETAILED DESCRIPTION

This disclosure describes an expanded polytetrafluoroethylene (ePTFE) composite, methods of making the composite, and methods of using the composite. In some embodiments, the composite is preferably heat-weldable to plastic and may be peeled from the plastic without leaving a residue. In an exemplary embodiment, the composite may be used as a protective barrier in an aseptic connector.

Aseptic coupling devices can be used to connect two or more sterilized fluid pathways. For example, aseptic coupling devices can be used to couple a fluid pathway from a first piece of processing equipment or container to a fluid pathway from a second piece of processing equipment or container to establish a sterile pathway for fluid transfer therebetween.

Aseptic connectors work by simultaneously removing two porous sterile barriers, usually membranes, from the connector assembly to open a sterile fluid pathway once the two components of the connector have been brought together. (See, e.g., Pendlebury, CELL & GENE THERAPIES: A GUIDE TO SINGLE-USE CONNECTIONS—10 Transferable Lessons from the Bioprocessing Industry, available online at content.cpcworldwide.com/Portals/0/Library/Resources/Literature/WhitePapers/Documents/CPC-cell-gene-therapies_white-paper.pdf.)

The membrane in an aseptic connector is typically a polyethersulfone (PES) membrane. PES is typically used because it may be sterilized using gamma irradiation or autoclaving.

PTFE membranes, however, may be cheaper and may exhibit superior chemical compatibility with aggressive solutions than PES. However, PTFE has long been avoided because it was not expected to be able to withstand irradiation or autoclaving.

This disclosure describes the development of an ePTFE composite that can serve as a sterile barrier or membrane in an aseptic connector. As described in the Examples, the composites can withstand sterilization. Moreover, the laminated ePTFE composites described herein may be peeled from a plastic component of the aseptic connector without leaving a visible residue.

Composite

In one aspect, this disclosure describes an ePTFE composite that includes a first layer of ePTFE, a nonwoven layer, and a second layer of ePTFE. In some embodiments, the layers may be laminated.

Specific embodiments of composites of the invention will now be described with reference to the accompanying drawings. This invention may, however, be embodied in many different forms and should not be construed as limited to the embodiments described in the drawings. In the drawings, like numbers refer to like elements.

Figure 1A:
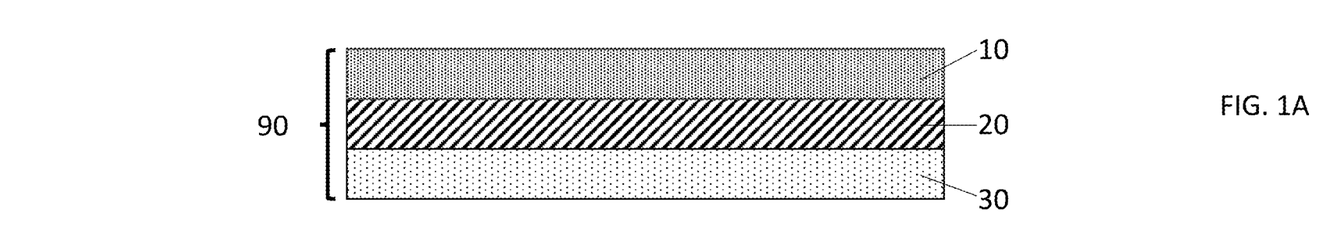
FIG. 1A-FIG. 1C show schematics of exemplary embodiments of an expanded polytetrafluoroethylene (ePTFE) composites.

As shown in FIG. 1A, in an exemplary embodiment, an ePTFE composite 90 includes a first layer of ePTFE 10, a nonwoven layer 20, and a second layer of ePTFE 30.

In some embodiments, the first layer of ePTFE 10 has a pore size of at least 0.05 microns, at least 0.1 microns, at least 0.2 microns, at least 0.3 microns, at least 0.5 microns, at least 1 micron, or at least 1.5 microns. In some embodiments, the first layer of ePTFE 10 has a pore size of up to 0.1 microns, up to 0.2 microns, up to 0.3 microns, up to 0.5 microns, up to 1.5 microns, up to 2 microns, up to 3 microns, up to 4 microns, up to 5 microns, up to 10 microns, up to 15 microns, up to 20 microns, up to 25 microns, or up to 30 microns. As used herein, pore size refers to mean flow pore size. In some embodiments, the mean flow pore size of a layer having a pore size of up to 10 microns is measured using capillary flow porometry, as described in the Examples. In some embodiments, the mean flow pore size of a layer having a pore size greater than 10 microns is measured using bubble point measurement, described in the Examples.

In some embodiments, the first layer of ePTFE 10 preferably has a pore size that is capable of removing bacteria from fluid. In some embodiments, the first layer of ePTFE 10 has a pore size of up to 0.2 microns. In an exemplary embodiment, the first layer of ePTFE 10 has a pore size of 0.07 microns.

The thickness of the first layer of ePTFE 10 may be any suitable thickness. In some embodiments, the first layer of ePTFE 10 may have a thickness of at least 0.001 mm, at least 0.005 mm, at least 0.01 mm, or at least 0.05 mm. In some embodiments, the first layer of ePTFE 10 may have a thickness of up to 0.005 mm, up to 0.01 mm, up to 0.05 mm, up to 0.0508 mm (0.002 inches), up to 0.06096 mm (0.0024 inches), up to 0.7 mm, up to 0.079 mm (0.0031 inches), up to 0.08 mm, up to 0.09 mm, or up to 0.1 mm. As used herein, thickness is measured according to TAPPI T 411 om-15 using a foot pressure of 0.5 psi.

In some embodiments, the small pore sizes of the first layer of ePTFE 10 result in a relatively low airflow. Although a low airflow is sometimes preferred, no airflow (such as that achieved by non-expanded PTFE), is not desirable in embodiments when the composite needs to be sterilized by autoclaving.

In some embodiments, the first layer of ePTFE 10 may have an average airflow of at least 0.05 cubic feet per minute per square foot (cfm/min/sq ft) at 0.5 inches of water, at least 0.1 cfm/min/sq ft at 0.5 inches of water, at least 0.2 cfm/min/sq ft at 0.5 inches of water, at least 0.3 cfm/min/sq ft at 0.5 inches of water, at least 0.4 cfm/min/sq ft at 0.5 inches of water, at least 0.5 cfm/min/sq ft at 0.5 inches of water, at least 1 cfm/min/sq ft at 0.5 inches of water, or at least 5 cfm/min/sq ft at 0.5 inches of water, measured according to according to ASTM D737-18. In some embodiments, the first layer of ePTFE 10 may have an average airflow of up to 1 cfm/min/sq ft at 0.5 inches of water, up to 5 cfm/min/sq ft at 0.5 inches of water, or up to 10 cfm/min/sq ft at 0.5 inches of water, measured according to ASTM D737-18.

As further described in Example 1, in an exemplary embodiment, the first layer of ePTFE 10 may include ePTFE having a 0.07 micron pore size, a maximum thickness of 0.06096 mm (0.0024 inches), and an average airflow of 0.3 cfm/min/sq ft at 0.5 inches of water (31 liters per hour per square centimeter (L/hour/cm$^2$) at 70 millibar (mbar)).

In an alternative embodiment, the first layer of ePTFE 10 may include ePTFE having a 0.2 micron pore size, a maximum thickness of 0.079 mm (0.0031 inches), and an average airflow of 0.23 cfm/min/sq ft at 0.5 inches of water (24 L/hour/cm$^2$ at 70 mbar).

A major surface of the first layer of ePTFE 10 is in contact with a first major surface of the nonwoven layer 20. In some embodiments, the first layer of ePTFE and the nonwoven layer may be laminated. As further described below, in the Methods of Making section, the first layer of ePTFE 10 and the nonwoven layer 20 may be heat laminated.

The nonwoven layer 20 may be any inelastic, nonwoven layer having good adhesion to ePTFE. The nonwoven layer is preferably sufficiently inelastic that it does not stretch when it is pulled. That is, the nonwoven layer (and, as a result, the composite, preferably has a low peak elongation percentage). In some embodiments, when incorporated in the composite, the nonwoven layer has sufficient tensile strength to withstand a 180 Degree Peel Test, as described in the Examples.

The composition of the nonwoven layer 20 may be selected depending on the intended use of the composite. In some embodiments, the nonwoven layer 20 includes polyester, polypropylene, or nylon, or a combination thereof.

The thickness of the nonwoven layer 20 may be selected depending on the intended use of the composite. In some embodiments, the nonwoven layer 20 may have a thickness of at least 0.05 mm or at least 0.1 mm. In some embodiments, the nonwoven layer 20 may have a thickness of up to 0.1 mm, up to 0.2 mm, up to 0.254 mm (0.010 inches), up to 0.3 mm, up to 0.4 mm, or up to 0.5 mm.

The basis weight of the nonwoven layer 20 may be selected depending on the intended use of the composite. In some embodiments, the nonwoven layer 20 may have a basis weight of at least 10 grams per square meter (gsm), at least 20 gsm, at least 30 gsm, at least 40 gsm, at least 50 gsm, at least 60 gsm, or at least 70 gsm. In some embodiments, the nonwoven layer 20 may have a basis weight of up to 50 gsm, up to 60 gsm, up to 70 gsm, up to 80 gsm, up to 90 gsm, or up to 100 gsm.

As described in Example 1, in an exemplary embodiment, the nonwoven layer 20 may be a nonwoven spunbonded polyester having a basis weight of 60 gsm, and a maximum thickness of 0.254 mm (0.010 inches).

A second major surface of the nonwoven layer 20 is in contact with a first major surface of the second layer of ePTFE 30. In some embodiments, the second layer of ePTFE and the nonwoven layer may be laminated. As further described below, in the Methods of Making section, the second layer of ePTFE 30 and the nonwoven layer 20 may be heat laminated.

Figure 3A:
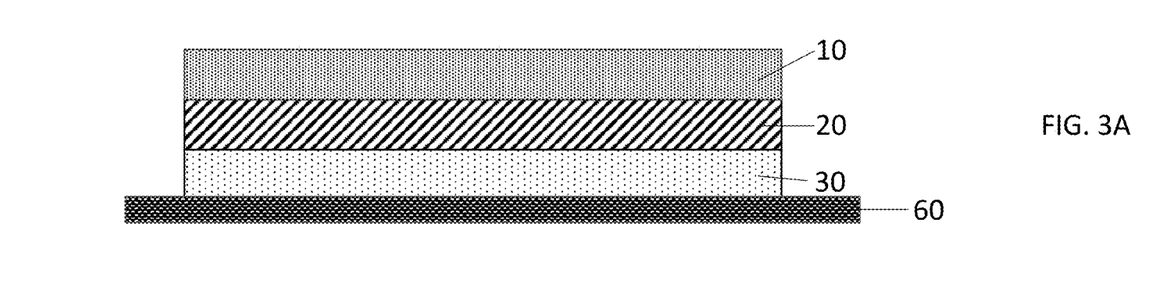
FIG. 3A-FIG. 3C show schematics of exemplary embodiments of ePTFE composites heat-welded to plastic.

As shown in FIG. 3A, and as further described below, in the Methods of Using section, a second major surface of the second layer of ePTFE 30 may be attached (for example, welded) to a plastic 60.

In some embodiments, the second layer of ePTFE 30 has a pore size of at least 0.05 microns, at least 0.1 microns, at least 0.2 microns, at least 0.5 microns, at least 1 micron, or at least 1.5 microns. In some embodiments, the second layer of ePTFE 30 has a pore size of up to 0.1 microns, up to 0.2 microns, up to 0.3 microns, up to 0.5 microns, up to 1.5 microns, up to 2 microns, up to 3 microns, up to 4 microns, up to 5 microns, up to 10 microns, up to 15 microns, up to 20 microns, up to 25 microns, or up to 30 microns.

In some embodiments, the second layer of ePTFE 30 preferably has a pore size of at least 1 micron. In some embodiments, the second layer of ePTFE 30 has a pore size of at least 1.5 microns. In some embodiments, the second layer of ePTFE 30 has a pore size of up to 1.5 microns, up to 2 microns, up to 3 microns, up to 4 microns, up to 5 microns, up to 10 microns, up to 15 microns, up to 20 microns, up to 25 microns, or up to 30 microns. In an exemplary embodiment, the second layer of ePTFE 10 has a pore size of 1.5 microns.

The second layer of ePTFE 30 may be any suitable thickness. In some embodiments, the second layer of ePTFE 30 may have a thickness of at least 0.001 mm, at least 0.005 mm, at least 0.01 mm, or at least 0.05 mm. In some embodiments, the second layer of ePTFE 30 may have a thickness of up to 0.005 mm, up to 0.01 mm, up to 0.03 mm (0.0015 inches), up to 0.05 mm, up to 0.0508 mm (0.002 inches), up to 0.7 mm, up to 0.079 mm (0.0031 inches), up to 0.08 mm, up to 0.09 mm, or up to 0.1 mm.

In some embodiments, the second layer of ePTFE 30 may have an airflow of at least 0.05 cubic feet per minute per square foot (cfm/min/sq ft) at 0.5 inches of water, at least 0.1 cfm/min/sq ft at 0.5 inches of water, at least 0.2 cfm/min/sq ft at 0.5 inches of water, at least 0.3 cfm/min/sq ft at 0.5 inches of water, at least 0.4 cfm/min/sq ft at 0.5 inches of water, at least 0.5 cfm/min/sq ft at 0.5 inches of water, at least 1 cfm/min/sq ft at 0.5 inches of water, or at least 5 cfm/min/sq ft at 0.5 inches of water, measured according to according to ASTM D737-18. In some embodiments, the second layer of ePTFE 30 may have an average airflow of up to 1 cfm/min/sq ft at 0.5 inches of water, up to 5 cfm/min/sq ft at 0.5 inches of water, or up to 10 cfm/min/sq ft at 0.5 inches of water, measured according to according to ASTM D737-18.

In some embodiments, the second layer of ePTFE 30 preferably has a greater average airflow than the first layer of ePTFE 10. For example, in some embodiments, the second layer of ePTFE 30 may have an average airflow of at least 5 cfm/min/sq ft at 0.5 inches of water, or at least 7 cfm/min/sq ft at 0.5 inches of water. In some embodiment, second layer of ePTFE 30 may have an average airflow of up to 7 cfm/min/sq ft at 0.5 inches of water, or up to 10 cfm/min/sq ft at 0.5 inches of water.

For example, as described in Example 1, the second layer of ePTFE 30 may be ePTFE having a 1.5 micron pore size, a maximum thickness of 0.0015 inches, and an average airflow of 7 cfm/min/sq ft at 0.5 inches of water (720 Liters per hour per square centimeter (L/hour/cm$^2$) at 70 mbar).

Figure 1B:
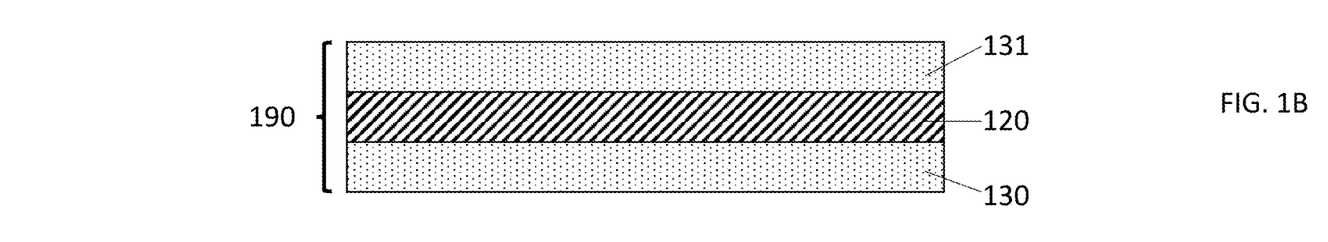

As shown in FIG. 1B, in an alternative embodiment, the composite 190 may include a first layer of ePTFE 131, a nonwoven layer 120, and a second layer of ePTFE 130. As in the embodiment shown in FIG. 1A, a major surface of the first layer of ePTFE 131 is in contact with a first major surface of the nonwoven layer 120, and a second major surface of the nonwoven layer 120 is in contact with a first major surface of the second layer of ePTFE 130.

In contrast to the embodiment shown in FIG. 1A where the second layer of ePTFE 30 preferably has a greater average airflow than the first layer of ePTFE 10, in FIG. 1B, the first layer of ePTFE 131 and the second layer of ePTFE 130 may have similar average airflows and, in some embodiments, may be made from ePTFE having the same characteristics (for example, from different portions of a larger ePTFE sheet).

Figure 1C:
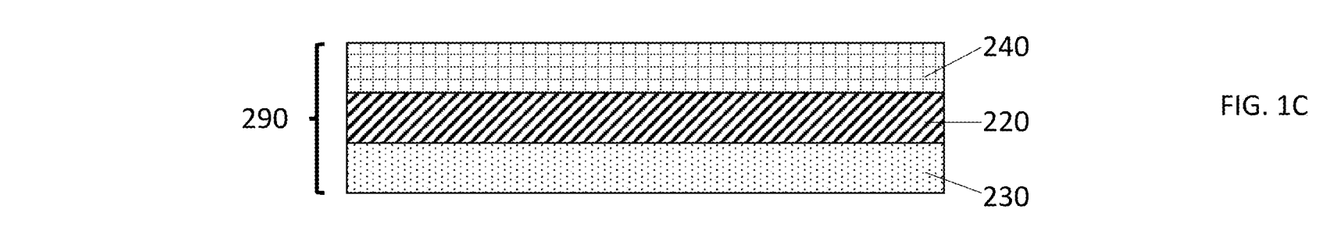

As shown in FIG. 1C, in a further alternative embodiment, the composite 290 may include a first layer of ePTFE 240, a nonwoven layer 220, and a second layer of ePTFE 230. As in the embodiments shown in FIG. 1A and FIG. 1B, a major surface of the first layer of ePTFE 240 is in contact with a first major surface of the nonwoven layer 220, and a second major surface of the nonwoven layer 120 is in contact with a first major surface of the second layer of ePTFE 230.

In contrast to the embodiment shown in FIG. 1A where the second layer of ePTFE 30 preferably has a greater average airflow than the first layer of ePTFE 10, in FIG. 1C, the first layer of ePTFE 240 may have greater average airflows than the second layer of ePTFE 230.

The overall airflow (permeability) of the composite will be determined by the layer of the composite having the lowest airflow. In some embodiments, the composite have an average airflow of at least 0.05 cubic feet per minute per square foot (cfm/min/sq ft) at 0.5 inches of water, at least 0.1 cfm/min/sq ft at 0.5 inches of water, at least 0.2 cfm/min/sq ft at 0.5 inches of water, at least 0.5 cfm/min/sq ft at 0.5 inches of water, at least 1 cfm/min/sq ft at 0.5 inches of water, or at least 5 cfm/min/sq ft at 0.5 inches of water, measured according to according to ASTM D737-18.

In some embodiments, the permeability may have an average airflow of up to 0.3 cfm/min/sq ft at 0.5 inches of water, up to 0.5 cfm/min/sq ft at 0.5 inches of water, up to 1 cfm/min/sq ft at 0.5 inches of water, up to 5 cfm/min/sq ft at 0.5 inches of water, or up to 10 cfm/min/sq ft at 0.5 inches of water, measured according to according to ASTM D737-18.

In an exemplary embodiment, when the composite includes a first layer of ePTFE having an average airflow of 0.3 cfm/min/sq ft at 0.5 inches of water, the composite may have an average airflow of in a range of 0.2 cfm/min/sq ft at 0.5 inches of water to 0.3 cfm/min/sq ft at 0.5 inches of water.

In some embodiments, the composite preferably has a peak elongation percentage of at least 10, at least 15, at least 20, or at least 25. In some embodiments, the composite preferably has a peak elongation percentage of up to 30, up to 35, up to 40, up to 45, or up to 50. In some embodiments, a lower peak elongation is preferred (for example, up to 50 or more preferably, up to 40, or even more preferably, up to 30), resulting in the composite not stretching when pulled.

In some embodiments, the composite has a thickness of at least 0.05 mm, at least 0.1 mm, or at least 0.2 mm. In some embodiments, the composite has a thickness of up to 0.2 mm, up to 0.3 mm, or up to 0.5 mm.

In some embodiments, the composite has a burst strength of at least 50 psi, at least 60 psi, at least 70 psi, or at least 75 psi. In some embodiments, the composite has a burst strength of up to 70 psi, up to 75 psi, up to 80 psi, up to 85 psi, or up to 90 psi.

Methods of Making the Composite

In another aspect this disclosure describes methods of making an ePTFE composite that includes a first layer of ePTFE, a nonwoven layer, and a second layer of ePTFE.

The ePTFE composite may be made by any suitable method. In some embodiments, the first layer of ePTFE or the second layer of ePTFE or both may be laminated to the nonwoven layer. In some embodiments both the first layer of ePTFE and the second layer of ePTFE may be heat laminated to the nonwoven layer. In some embodiments, the first layer of ePTFE may be heat laminated to a first major surface of the nonwoven layer and then the second layer of ePTFE may be heat laminated to a second major surface of the nonwoven layer.

In some embodiments, the first layer of ePTFE may be heat laminated to the nonwoven layer at a temperature of at least 300° F., at least 350° F., at least 400° F., at least 450° F., or at least 500° F. In some embodiments, the first layer of ePTFE may be heat laminated to the nonwoven layer at a temperature of up to 350° F., up to 400° F., up to 450° F., up to 500° F., up to 550° F., or up to 600° F. For example, in some embodiments, the first layer of ePTFE may be heat laminated to the nonwoven layer at a temperature in a range of 350° F. to 600° F.

In some embodiments, the first layer of ePTFE may be heat laminated to the nonwoven layer at a line speed of at least 1 foot per minute (ft/min), at least 3 ft/min, at least 5 ft/min, at least 10 ft/min, or at least 20 ft/min. In some embodiments, the first layer of ePTFE may be heat laminated to the nonwoven layer at a line speed of up to 3 ft/min, up to 5 ft/min, up to 10 ft/min, up to 20 ft/min, up to 25 ft/min, or up to 30 ft/min. For example, in some embodiments, the first layer of ePTFE may be heat laminated to the nonwoven layer at a line speed in a range of 3 ft/min to 20 ft/min.

In some embodiments, the first layer of ePTFE may be heat laminated to the nonwoven layer at a pressure of at least 80 psi, at least 100 psi, at least 200 psi, at least 300 psi, at least 400 psi, or at least 500 psi. In some embodiments, the first layer of ePTFE may be heat laminated to the nonwoven layer at a pressure of up to 200 psi, up to 300 psi, up to 400 psi, up to 500 psi, up to 600 psi, up to 700 psi, up to 800 psi, up to 900 psi, or up to 1000 psi. For example, in some embodiments, the first layer of ePTFE may be heat laminated to the nonwoven layer at a pressure in a range of 80 psi to 1000 psi.

In an exemplary embodiment, the first layer of ePTFE may be heat laminated to the nonwoven layer at a temperature of 550° F., at a line speed of 5 ft/min, and a pressure of 400 psi.

In some embodiments, the second layer of ePTFE may be heat laminated to the nonwoven layer at a temperature of at least 300° F., at least 350° F., at least 400° F., at least 450° F., or at least 500° F. In some embodiments, the second layer of ePTFE may be heat laminated to the nonwoven layer at a temperature of up to 350° F., up to 400° F., up to 450° F., up to 500° F., up to 550° F., or up to 600° F. In some embodiments, the second layer of ePTFE may be heat laminated to the nonwoven layer at a temperature in a range of 350° F. to 600° F.

In some embodiments, the second layer of ePTFE may be heat laminated to the nonwoven layer at a line speed of at least 1 ft/min, at least 3 ft/min, at least 5 ft/min, at least 10 ft/min, or at least 20 ft/min. In some embodiments, the second layer of ePTFE may be heat laminated to the nonwoven layer at a line speed of up to 3 ft/min, up to 5 ft/min, up to 10 ft/min, up to 20 ft/min, up to 25 ft/min, or up to 30 ft/min. For example, in some embodiments, the first second of ePTFE may be heat laminated to the nonwoven layer at a line speed in a range of 3 ft/min to 20 ft/min.

In some embodiments, the second layer of ePTFE may be heat laminated to the nonwoven layer at a pressure of at least 80 psi, at least 100 psi, at least 200 psi, at least 300 psi, at least 400 psi, or at least 500 psi. In some embodiments, the second layer of ePTFE may be heat laminated to the nonwoven layer at a pressure of up to 200 psi, up to 300 psi, up to 400 psi, up to 500 psi, up to 600 psi, up to 700 psi, up to 800 psi, up to 900 psi, or up to 1000 psi. For example, in some embodiments, the second layer of ePTFE may be heat laminated to the nonwoven layer at a pressure in a range of 80 psi to 1000 psi.

In an exemplary embodiment, the second layer of ePTFE may be heat laminated to the nonwoven layer at a temperature of 550° F., at a line speed of 5 ft/min, and a pressure of 400 psi.

In some embodiments, lamination may be performed as described in U.S. Pat. No. 5,037,457.

Methods of Using the Composite

In a further aspect, this disclosure describes methods of using an ePTFE composite that includes a first layer of ePTFE, a nonwoven layer, and a second layer of ePTFE.

In some embodiments, a method of using the ePTFE composite includes attaching the composite and, specifically, a major surface of the second layer of ePTFE to a plastic. Any suitable plastic may be used. Exemplary plastics include polycarbonate, polyethelene, polypropylene, nylon, polyester, etc. In some embodiments, the plastic preferably includes polycarbonate. In some embodiments, the plastic is polycarbonate.

Figure 3B:
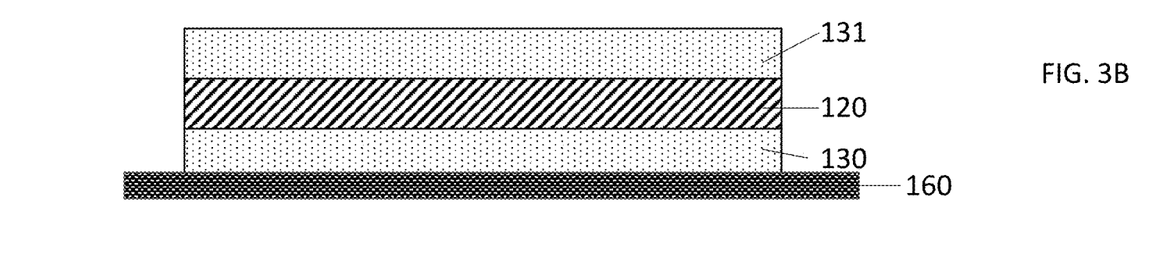
Figure 3C:
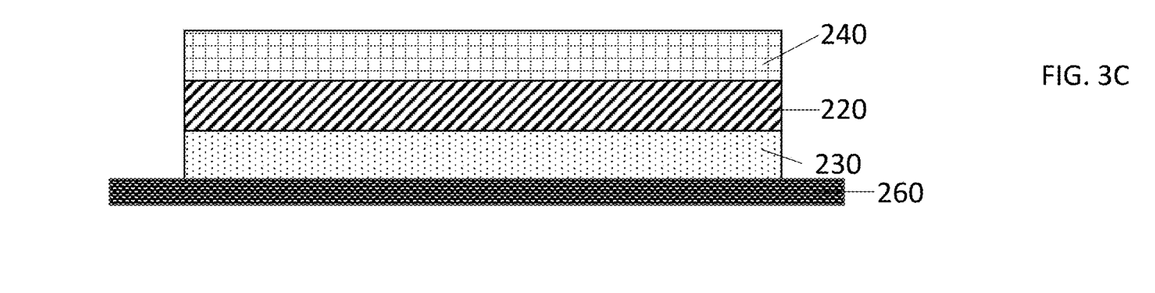

For example, as shown in FIG. 3A, a second major surface of the second layer of ePTFE 30 may be attached to a plastic 60; as shown in FIG. 3B, a second major surface of the second layer of ePTFE 130 may be attached to a plastic 160; or, as shown in FIG. 3C, a second major surface of the second layer of ePTFE 230 may be attached to a plastic 260.

The plastic may be present in, for example, an aseptic connector. In an exemplary embodiment, the composite may be used as a protective barrier in an aseptic connector. In some embodiments, the aseptic connector may be an AseptiQuick® Connector (CPC, St. Paul, Minn.). In some embodiments, the aseptic connector may be a connector as described in US Publication No. 2009/0188575 or U.S. Pat. No. 9,364,653.

The ePTFE composite may be attached to the plastic by any suitable method. For example, the ePTFE composite may be welded (for example, heat welded or ultrasonic welded) to the plastic. In some embodiments, the ePTFE composite may be heat welded to the plastic as described in the Examples.

In some embodiments, a method of using the ePTFE composite further includes removing the composite from the plastic. In a preferred embodiment, the ePTFE composite may be peeled from the plastic without leaving a visible residue.

In some embodiments, the composite does not leave a visible residue (as viewed with the naked eye) after being peeled from the plastic, where the peeling is performed by hand.

In some embodiments, the composite does not leave a visible residue (as viewed with the naked eye) after being peeled from the plastic, where the peeling is performed as described in the 180 Degree Peel Test, as described in the Examples.

Figure 2A:
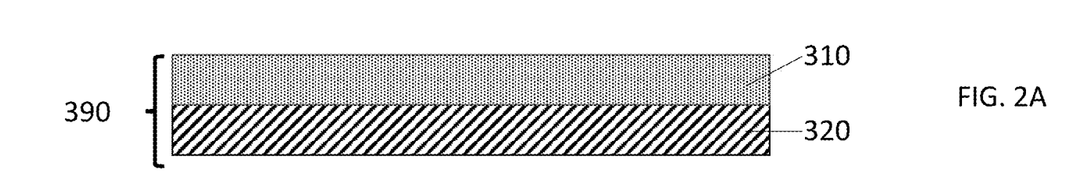
FIG. 2A-FIG. 2B show schematics of comparative ePTFE composites.
Figure 2B:
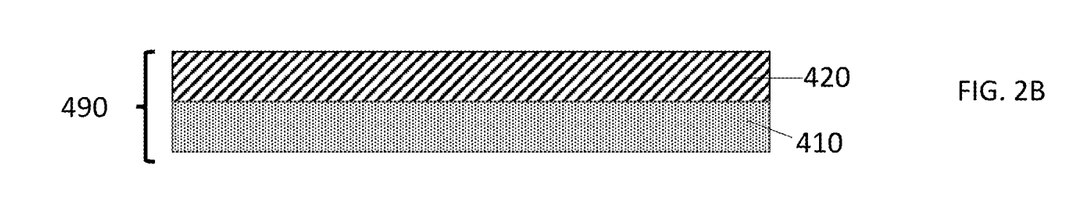
Figure 4A:
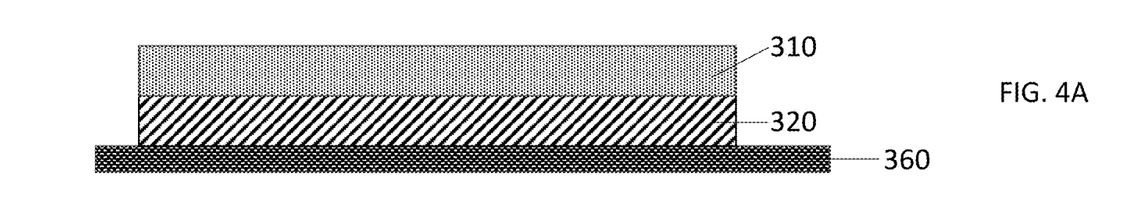
FIG. 4A-FIG. 4B show schematics of comparative ePTFE composites heat-welded to plastic.
Figure 4B:
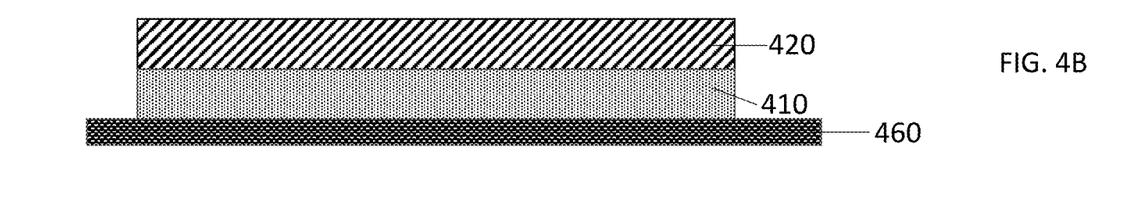

In two-layer ePTFE composites (390 and 490) including only a non-woven layer (320 or 420) and a layer of ePTFE (310 or 410), shown in FIG. 2A-FIG. 2B, where the ePTFE layer has a pore size capable of removing bacteria from fluid (for example, up to 0.2 microns), when the composite (390 or 490) is attached to a plastic, the composite leaves a visible residue after being peeled from a plastic. This residue is left when the nonwoven layer 320 is attached to a plastic 360 (FIG. 4A) or when the layer of ePTFE 410 is attached to a plastic 460 (FIG. 4B). In contrast, when a layer of ePTFE having a larger pore size (for example, greater than 1 micron) (30, 130, or 230) is attached to a plastic (60, 160, or 260) (FIG. 3A-FIG. 3C), the composite does not leave a visible residue (as viewed with the naked eye) after being peeled from the plastic.

Exemplary Composition Aspects

A1. An ePTFE composite comprising:
 a first layer of ePTFE,
 a nonwoven layer, and
 a second layer of ePTFE,
  wherein a major surface of the first layer of ePTFE is in contact with a first major surface of the nonwoven layer, and wherein a first major surface of the second layer of ePTFE is in contact with a second major surface of the nonwoven layer.

A2. The ePTFE composite of Aspect A1, wherein the first layer of ePTFE is laminated to the first major surface of the nonwoven layer, and wherein the first major surface of the second layer of ePTFE is laminated to the second major surface of the nonwoven layer.

A3. The ePTFE composite of Aspect A1 or A2, wherein the first layer of ePTFE has a pore size of up to 0.2 microns.

A4. The ePTFE composite of any one of Aspects A1 to A3, wherein the first layer of ePTFE has a thickness in a range of 0.001 mm to 0.1 mm.

A5. The ePTFE composite of any one of Aspects A1 to A4, wherein the first layer of ePTFE has an average airflow in a range of 0.05 cfm/min/sq ft at 0.5 inches water to 0.5 cfm/min/sq ft at 0.5 inches of water.

A6. The ePTFE composite of any one of Aspects A1 to A5, wherein the first layer of ePTFE has a 0.07 micron pore size, a thickness of up to 0.06096 mm (0.0024 inches), and an average airflow of 0.3 cfm/min/sq ft at 0.5 inches of water (31 L/hour/cm$^2$ at 70 mbar).

A7. The ePTFE composite of any one of Aspects A1 to A6, wherein the first layer of ePTFE has a 0.2 micron pore size, a thickness of up to 0.0031 inches, and an average airflow of 0.23 cfm/min/sq ft at 0.5 inches of water (24 L/hour/cm$^2$ at 70 mbar).

A8. The ePTFE composite of Aspect A1 or A2, wherein the first layer of ePTFE has a pore size of at least 1 micron and up to 5 microns.

A9. The ePTFE composite of any one of Aspects A1, A2 or A8, wherein the first layer of ePTFE has a thickness in a range of 0.001 mm to 0.1 mm.

A10. The ePTFE composite of any one of Aspects A1, A2, A8, or A9, wherein the first layer of ePTFE has an average airflow in a range of 0.05 cfm/min/sq ft at 0.5 inches water to 10 cfm/min/sq ft at 0.5 inches of water.

A11. The ePTFE composite of any one of Aspects A1, A2, A8, A9, or A10, wherein the first layer of ePTFE has a 1.5 micron pore size, a thickness of up to 0.03 mm (0.0015 inches), and an average airflow of 7 cfm/min/sq ft at 0.5 inches of water (720 L/hour/cm$^2$ at 70 mbar).

A12. The ePTFE composite of any one of Aspects A1 to A11, wherein the nonwoven layer comprises a nonwoven spunbonded polyester.

A13. The ePTFE composite of any one of Aspects A1 to A12, wherein the nonwoven layer has a basis weight of in a range of 10 grams per square meter (gsm) to 100 gsm.

A14. The ePTFE composite of any one of Aspects A1 to A13, wherein the nonwoven layer a has thickness of up to 0.5 mm.

A15. The ePTFE composite of any one of Aspects A1 to A14, wherein the nonwoven layer comprises a nonwoven spunbonded polyester having a basis weight of 60 gsm, and a thickness of up to 0.254 mm (0.010 inches).

A16. The ePTFE composite of any one of Aspects A1 to A15, wherein the second layer of ePTFE has a pore size of at least 1 micron and up to 5 microns.

A17. The ePTFE composite of any one of Aspects A1 to A16, wherein the second layer of ePTFE has a thickness in a range of 0.001 mm to 0.1 mm.

A18. The ePTFE composite of any one of Aspects A1 to A17, wherein the second layer of ePTFE has an average airflow in a range of 0.05 cfm/min/sq ft at 0.5 inches water to 10 cfm/min/sq ft at 0.5 inches of water.

A19. The ePTFE composite of any one of Aspects A1 to A18, wherein the second layer of ePTFE has a 1.5 micron pore size, a thickness of up to 0.03 mm (0.0015 inches), and an average airflow of 7 cfm/min/sq ft at 0.5 inches of water (720 L/hour/cm$^2$ at 70 mbar).

A20. An ePTFE composite comprising:
a first layer of ePTFE, wherein the first layer of ePTFE has a 0.07 micron pore size, a thickness of up to 0.06096 mm (0.0024 inches), and an average airflow of 0.3 cfm/min/sq ft at 0.5 inches of water (31 L/hour/cm$^2$ at 70 mbar);
a nonwoven layer, the nonwoven layer comprises a nonwoven spunbonded polyester having a basis weight of 60 gsm, and a thickness of up to 0.254 mm (0.010 inches); and
a second layer of ePTFE, wherein the second layer of ePTFE has a 1.5 micron pore size, a thickness of up to 0.03 mm (0.0015 inches), and an average airflow of 7 cfm/min/sq ft at 0.5 inches of water (720 L/hour/cm$^2$ at 70 mbar);
wherein a major surface of the first layer of ePTFE is heat laminated to a first major surface of the nonwoven layer, and wherein a first major surface of the second layer of ePTFE is heat laminated to a second major surface of the nonwoven layer.

A21. A composition comprising the ePTFE composite of any one of Aspects A1 to A20, wherein a second major surface of the second layer of ePTFE is attached to a plastic.

A22. The composition of Aspect A21, wherein the plastic comprises polycarbonate.

A23. An aseptic connector comprising the composition of Aspect A21 or A22.

Exemplary Method of Making Aspects

B1. A method comprising making the ePTFE composite of any one of the Exemplary Composition Aspects (A1 to A23).

B2. The method of Aspect B1, the method comprising laminating the first layer of ePTFE to the first major surface of the nonwoven layer, and laminating the first major surface of the second layer of ePTFE to the second major surface of the nonwoven layer.

B3. The method of B2, wherein the method comprises laminating the first layer of ePTFE to the first major surface of the nonwoven layer prior to laminating the first major surface of the second layer of ePTFE to the second major surface of the nonwoven layer.

B4. The method of any one of Aspects B1 to B3, wherein the laminating comprises heat laminating.

Exemplary Method of Using Aspects

C1. A method of using the ePTFE composite of any one of the Exemplary Composition Aspects (A1 to A23).

C2. The method of Aspect C1, the method comprising attaching a second major surface of the second layer of ePTFE to a plastic.

C3. The method of Aspect C2, wherein the plastic comprises polycarbonate.

C4. The method of Aspect C2 or C3, wherein attaching comprises heat welding or ultrasonic welding.

C5. The method of C4, wherein attaching comprises heat welding, and heat welding comprises welding the composite to plastic by a 3 mm annular weld having a 4 cm diameter using a temperature in a range of 150° C.-290° C. for 1 to 10 seconds at up to 10 psi.

C6. The method of any one of Aspects C2 to C5, wherein an aseptic connector comprises the plastic.

C7. The method of any one of Aspects C2 to C6, the method further comprising removing the ePTFE composite from the plastic.

C8. The method of C7, wherein the ePTFE composite does not leave a visible residue after being removed from the plastic.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials, and solvents used in the following examples were purchased from commercial suppliers (such as Sigma Aldrich, St. Louis, Mo.) and were used without further purification unless otherwise indicated.

Test Methods

Tensile Strength & Peak Elongation Test

Tensile strength (in the cross-machine direction (CD) and the machine direction (MD)) was determined as described in TAPPI T 494 om-06 entitled "Tensile properties of paper and paperboard (using constant rate of elongation apparatus)" using a sample having a size of 1 inches by 6 inches.

Stretch (also referred to herein as percentage elongation or peak elongation percentage (%)) was determined as described in TAPPI T 494 om-06 entitled "Tensile properties of paper and paperboard (using constant rate of elongation apparatus)".

Burst Strength Testing

Burst strength testing was performed as described in TAPPI 403 om-2, entitled "Bursting strength of paper."

Pore Size

The mean flow pore size of a layer having a pore size of up to 10 microns was measured using capillary flow porometry, as described in ASTM F316-03, entitled "Test Methods for Pore Size Characteristics of Membrane Filters by Bubble Point and Mean Flow Pore Test."

The mean flow pore size of a layer having a pore size greater than 10 microns was measured using bubble point technique, as described in the Handbook of Nonwoven Filter Media (1$^{st}$ Edition, 2007), applying Equation 6.10 and isopropyl alcohol as a reservoir fluid.

Thickness Testing

Thickness was measured according to TAPPI T 411 om-15, entitled "Thickness (caliper) of paper, paperboard, and combined board," except that a foot pressure of 0.5 psi was used.

Gamma Sterilization

Composites were exposed to 50 kGy (5.0 MRad) of gamma radiation. Composites that did not exhibit a hole larger than 30 microns were considered to "pass."

Autoclave

Composites were exposed to temperatures of up to 266° F. (130° C.) for 30 minutes.

180 Degree Peel Test

The 180 Degree Peel Test is performed as described in ASTM D903-98, entitled "Test Method for Peel or Stripping Strength of Adhesive Bonds."

Residue Testing

Figure 5:
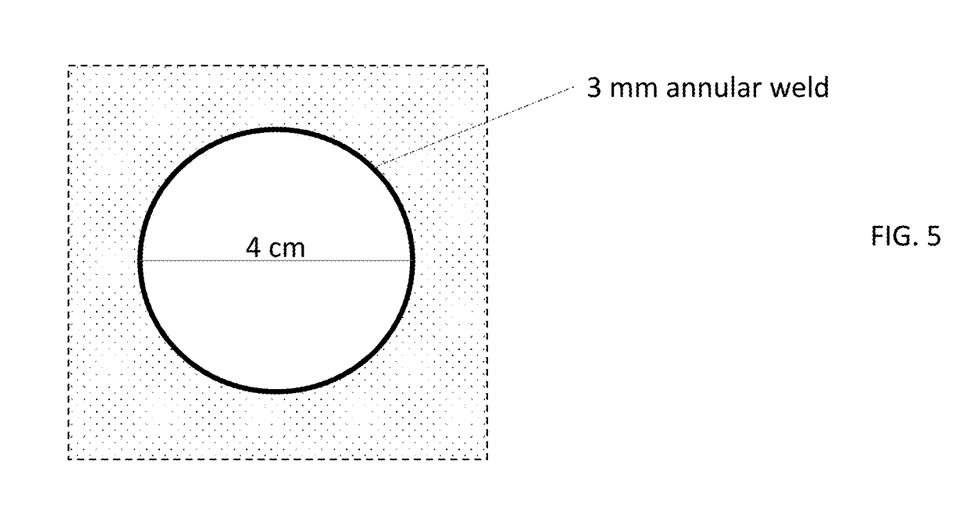
FIG. 5 shows a diagram of a composite heat welded to polycarbonate using a 3 mm annular weld having a 4 cm diameter.

Composites were heat welded to polycarbonate by a 3 mm annular weld having a 4 cm diameter (see FIG. 5) using a temperature in a range of 150° C.-290° C. for 1 to 10 seconds at up to 10 psi.

Composites were removed from the polycarbonate using the 180 Degree Peel Test or by hand, and the polycarbonate was examined for the presence of visible residue from the composite (without magnification).

Example 1

This Example describes making and testing of a laminated ePTFE composite that includes a first layer of ePTFE, a nonwoven layer, and a second layer of ePTFE.

The first layer of ePTFE had a 0.07 micron pore size, a maximum thickness of 0.0024 inches, and an average airflow of 0.3 cfm/min/sq ft at 0.5 inches of water (31 L/hour/cm² at 70 mbar).

The nonwoven layer was a spunbonded polyester nonwoven having a basis weight of 60 gsm, and a maximum thickness of 0.010 inches.

The second layer of ePTFE had a 1.5 micron pore size, a maximum thickness of 0.0015 inches, and an average airflow of 7 cfm/min/sq ft at 0.5 inch of water (720 L/hour/cm² at 70 mbar).

The first layer of ePTFE was heat laminated to the nonwoven layer at a temperature of 550° F., at a line speed of 5 ft/min, and a pressure of 400 psi, and then the second layer of ePTFE was heat laminated to the nonwoven layer at a temperature of 550° F., at a line speed of 5 ft/min, and a pressure of 400 psi.

Properties of the resulting composites (n=3 or 4) are shown in Table 1.

After Gamma Sterilization, the composites were evaluated for hole formation. The composites did not exhibit holes larger than 30 microns.

The second layer of ePTFE of the composite was adhered to polycarbonate using heat welding (for example, 290° C. for 2 seconds at 10 psi), then the composite was peeled from the polycarbonate by hand. No visible residue from the composite was retained on the polycarbonate (as observed with the naked eye.)

Comparative Example 1

This Example describes making an testing of a laminated ePTFE composite that includes a first layer of ePTFE and a nonwoven layer.

The first layer of ePTFE had a 0.07 micron pore size, a maximum thickness of 0.0024 inches, and an average airflow of 0.3 cfm/min/sq ft at 0.5 inches of water (31 L/hour/cm² at 70 mbar).

The nonwoven layer was a spunbonded polyester nonwoven having a basis weight of 60 gsm, and a maximum thickness of 0.010 inches.

The first layer of ePTFE was heat laminated to the nonwoven layer at a temperature of 550° F., at a line speed of 5 ft/min, and a pressure of 400 psi.

The first layer of ePTFE of the composite was adhered to polycarbonate using heat welding (for example, 290° C. for 2 seconds at 10 psi), then peeled from the polycarbonate by hand. The nonwoven layer was adhered to polycarbonate using heat welding (for example, 290° C. for 2 seconds at 10 psi), then peeled from the polycarbonate by hand. In both cases, visible residue from the composite was retained on the polycarbonate (as observed with the naked eye.)

TABLE 1

|  | N = 3 Perm (ft/min at 0.5" H20) | N = 3 Thickness (mm) | N = 3 Burst (psi) | N = 4 Tensile (lbs/in) CD | N = 4 Tensile (lbs/in) MD | N = 4 Peak Elongation % |
|---|---|---|---|---|---|---|
| Sample 1 | 0.2 | 0.14 | 78.2 | 19.2 | 34.9 | 27.87 |
| Sample 2 | 0.2 | 0.15 | 82.1 | 17.12 | 32.46 | 26.03 |
| Sample 3 | 0.2 | 0.15 | 79.9 | 17.82 | 31.11 | 25.29 |
| Sample 4 | N/A | N/A | N/A | 17.56 | 32.86 | 29.91 |
| Average | 0.2 | 0.15 | 80.07 | 17.93 | 32.83 | 27.28 |

CD = cross-machine direction
MD = machine direction

Example 2

This Example describes making of a laminated ePTFE composite that includes a first layer of ePTFE, a nonwoven layer, and a second layer of ePTFE.

The first layer of ePTFE had a 1.5 micron pore size, a maximum thickness of 0.0015 inches, and an average airflow of 7 cfm/min/sq ft at 0.5 inches of water (720 L/hour/cm² at 70 mbar).

The nonwoven layer was a spunbonded polyester nonwoven having a basis weight of 60 gsm, and a maximum thickness of 0.010 inches.

The second layer of ePTFE had a 1.5 micron pore size, a maximum thickness of 0.0015 inches, and an average airflow of 7 cfm/min/sq ft at 0.5 inches of water (720 L/hour/cm² at 70 mbar).

The first layer of ePTFE was heat laminated to the nonwoven layer at a temperature of 550° F., at a line speed of 5 ft/min, and a pressure of 400 psi, and then the second layer of ePTFE was heat laminated to the nonwoven layer at a temperature of 550° F., at a line speed of 5 ft/min, and a pressure of 400 psi.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An ePTFE composite comprising:
   a first layer of ePTFE, wherein the first layer of ePTFE has a 0.07 micron mean flow pore size, a thickness of up to 0.0508 mm, and an average airflow of 0.05 to 0.3 cfm/sq ft at 0.5 inches of water;
   a nonwoven layer, the nonwoven layer comprises a nonwoven spunbonded polyester having a basis weight of 10 to 100 gsm, and a thickness of up to 0.25 mm; and a second layer of ePTFE, wherein the second layer of ePTFE has a 1.5 micron mean flow pore size, a thickness of up to 0.03 mm, and an average airflow of 7 to 10 cfm/sq ft at 0.5 inches of water;

wherein a major surface of the first layer of ePTFE is heat laminated to a first major surface of the nonwoven layer, and wherein a first major surface of the second layer of ePTFE is heat laminated to a second major surface of the nonwoven layer, and wherein the ePTFE composite has an average airflow of 0.05 cfm/sq ft to 0.3 cfm/sq ft at 0.5 inches of water.

2. The ePTFE composite of claim 1, wherein the first layer of ePTFE has a thickness in a range of 0.001 mm to 0.0508 mm.

3. The ePTFE composite of claim 1, wherein the first layer of ePTFE has an average airflow of 0.23 cfm/sq ft at 0.5 inches of water.

4. The ePTFE composite of claim 1, wherein the nonwoven layer has a basis weight of in a range of 10 to 60 gsm.

5. The ePTFE composite of claim 1, wherein the second layer of ePTFE has a thickness in a range of 0.001 mm to 0.03 mm.

6. A composition comprising the ePTFE composite of claim 1, wherein a second major surface of the second layer of ePTFE is attached to a plastic.

7. The composition of claim 6, wherein the plastic comprises polycarbonate.

8. An aseptic connector comprising the composition of claim 6.

9. A method of forming the ePTFE composite of claim 1, the method comprising:
laminating the first layer of ePTFE to the first major surface of the nonwoven layer, and
laminating the first major surface of the second layer of ePTFE to the second major surface of the nonwoven layer.

10. The method of claim 9, wherein the method comprises laminating the first layer of ePTFE to the first major surface of the nonwoven layer prior to laminating the first major surface of the second layer of ePTFE to the second major surface of the nonwoven layer.

11. A method of producing a composition comprising the ePTFE composite of claim 1, the method comprising:
laminating the first layer of ePTFE to the first major surface of the nonwoven layer,
laminating the first major surface of the second layer of ePTFE to the second major surface of the nonwoven layer, and
attaching the second major surface of the second layer of ePTFE to a plastic.

12. The method of claim 11, wherein the plastic comprises polycarbonate and wherein attaching comprises heat welding or ultrasonic welding.

* * * * *